US006343327B2

(12) United States Patent
Daniels, Jr. et al.

(10) Patent No.: US 6,343,327 B2
(45) Date of Patent: *Jan. 29, 2002

(54) SYSTEM AND METHOD FOR ELECTRONIC AND PHYSICAL MASS MAILING

(75) Inventors: Edward Paul Daniels, Jr., Trumbull, CT (US); John Kwant, Tarrytown, NY (US); Paul Mitchell, Danbury, CT (US); John Rahrig, Stratford, CT (US); Karl Schumacher, Westport, CT (US); Clare Woodman, Norwalk, CT (US)

(73) Assignee: Pitney Bowes Inc., Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/968,649

(22) Filed: Nov. 12, 1997

(51) Int. Cl.$^7$ .............................................. G06F 13/14
(52) U.S. Cl. ...................................... 709/239; 345/335
(58) Field of Search ..................... 395/200.49; 345/335; 358/402, 4.3; 709/238, 239, 240; 382/137

(56) References Cited

U.S. PATENT DOCUMENTS

| 4,907,161 | A | * | 3/1990 | Sansone et al. ............. 705/403 |
| 4,908,850 | A | | 3/1990 | Masson et al. ................ 379/88 |
| 4,941,091 | A | | 7/1990 | Breault et al. .............. 364/406 |
| 5,142,662 | A | | 8/1992 | Gump et al. ................ 395/100 |
| 5,187,787 | A | | 2/1993 | Skeen et al. ................ 395/600 |
| 5,220,501 | A | | 6/1993 | Lawlor et al. .............. 364/408 |
| 5,280,531 | A | | 1/1994 | Hunter ........................... 382/1 |
| 5,283,829 | A | | 2/1994 | Anderson ..................... 380/24 |
| 5,381,527 | A | * | 1/1995 | Inniss et al. ........... 395/200.69 |
| 5,383,113 | A | | 1/1995 | Knight et al. ............... 364/401 |
| 5,465,206 | A | | 11/1995 | Hilt et al. ................... 364/406 |
| 5,479,411 | A | | 12/1995 | Klein ....................... 370/110.1 |
| 5,483,445 | A | | 1/1996 | Pickering .................... 364/406 |
| 5,493,692 | A | | 2/1996 | Thelmer et al. ............ 455/26.1 |
| 5,496,991 | A | | 3/1996 | Delfer et al. ................ 235/379 |
| 5,508,817 | A | | 4/1996 | Kunigami .................... 358/402 |
| 5,509,071 | A | | 4/1996 | Petrie, Jr. et al. ................ 380/4 |

(List continued on next page.)

FOREIGN PATENT DOCUMENTS

| EP | 0 371 607 A2 | 10/1989 |
| EP | 0838 774 | 10/1997 |

OTHER PUBLICATIONS

A co-pending application S.N. 08/968,651, Attorney Docket No. E–685 filed Nov. 12, 1997.
A co-pending application S.N. 08/968,498, Attorney Docket No. E–653 filed Nov. 12, 1997.
A pending application S.N. 08/772,293 filed Dec. 23, 1996.
"Methodology for Mail Delivery in a Multimedia Environment" IBM Technical Disclosure Bulletin, vol. 36, No. 4, Apr. 1993, pp. 507–508, XP000364598, Armonk, NY.
Workstation Communications System, IBM Technical Disclosure Bulletin, vol. 37, No. 9, Sep. 1994, pp. 101–104, XPoo0473347, Armonk, NY US.

Primary Examiner—Von J. Couso
(74) Attorney, Agent, or Firm—Michael J. Cummings; Christopher J. Capelli; Michael E. Melton

(57) ABSTRACT

A printstream processor separates documents, e.g. in a printstream or batch, into a physical delivery printstream and an electronic delivery printstream based on delivery preferences stored in a database. The documents in the physical delivery printstream are printed and combined with physical inserts for physical delivery, e.g. by the U.S. Postal Server. The documents in the electronic delivery printstream are combined with electronic inserts for electronic delivery, for example, via electronic mail, facsimile, pager, or to a server on World Wide Web.

30 Claims, 6 Drawing Sheets

U.S. PATENT DOCUMENTS

| | | | |
|---|---|---|---|
| 5,513,126 A | 4/1996 | Harkins et al. | 364/514 |
| 5,579,087 A * | 11/1996 | Salgado | 399/1 |
| 5,608,786 A | 3/1997 | Gordon et al. | 379/100 |
| 5,627,764 A | 5/1997 | Schutzman et al. | 364/514 R |
| 5,630,060 A | 5/1997 | Tang et al. | 395/200.01 |
| 5,657,461 A | 8/1997 | Harkins et al. | 395/333 |
| 5,659,481 A | 8/1997 | Qutub et al. | 364/478.08 |
| 5,675,507 A | 10/1997 | Bobo, II | 364/514 R |
| 5,694,551 A | 12/1997 | Doyle et al. | 395/226 |
| 5,696,906 A | 12/1997 | Peters et al. | 395/234 |
| 5,699,528 A | 12/1997 | Hogan | 395/240 |
| 5,761,650 A | 6/1998 | Munsil et al. | 705/34 |
| 5,790,790 A | 8/1998 | Smith et al. | 395/200 |
| 5,794,221 A | 8/1998 | Egendorf | 705/40 |
| 5,802,498 A | 9/1998 | Comesanas | 705/34 |
| 5,825,865 A | 10/1998 | Oberlander et al. | 379/211 |
| 5,832,460 A | 11/1998 | Bednar et al. | 705/27 |
| 5,870,089 A * | 2/1999 | Fabbio et al. | 345/335 |
| 5,872,926 A | 2/1999 | Levac et al. | 395/200.36 |
| 5,873,073 A | 2/1999 | Bresnan et al. | 705/410 |
| 5,884,284 A | 3/1999 | Peters et al. | 705/30 |
| 5,956,693 A * | 9/1999 | Geerlings | 705/14 |
| 5,963,925 A | 10/1999 | Kolling et al. | 705/40 |
| 6,031,625 A | 2/2000 | Sherman et al. | 358/1.18 |
| 6,044,362 A | 3/2000 | Neely | 705/34jf139 |

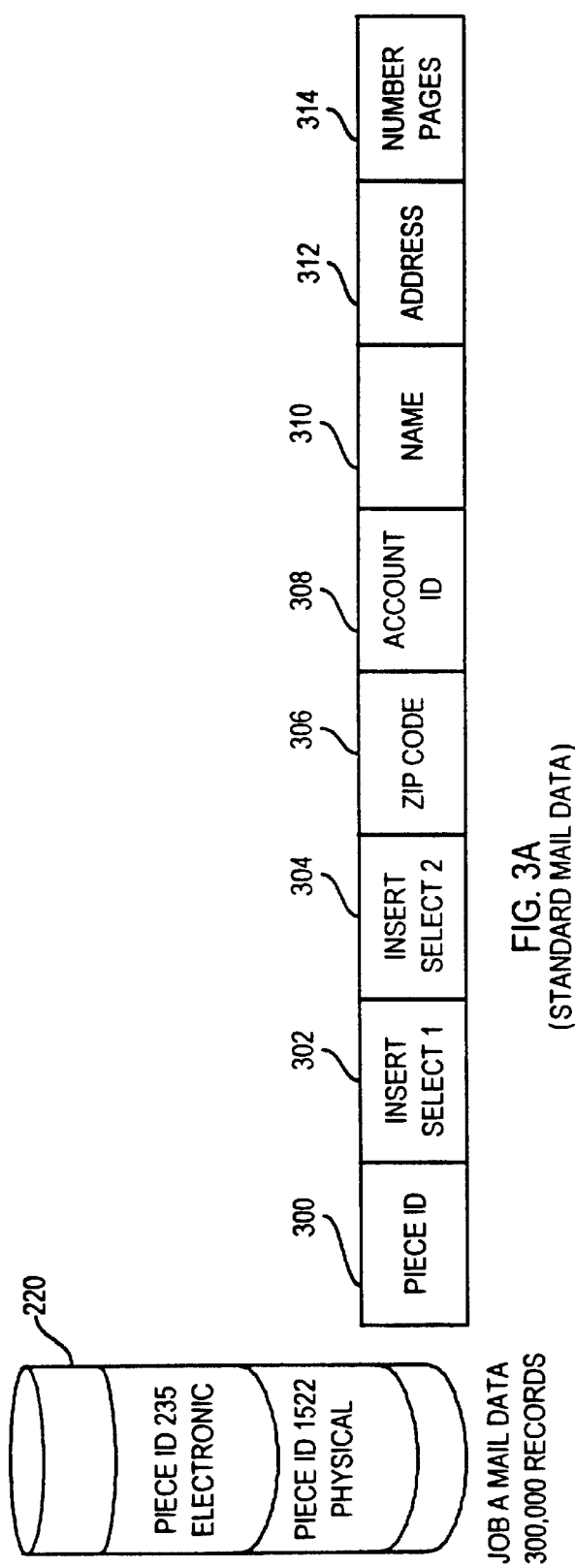
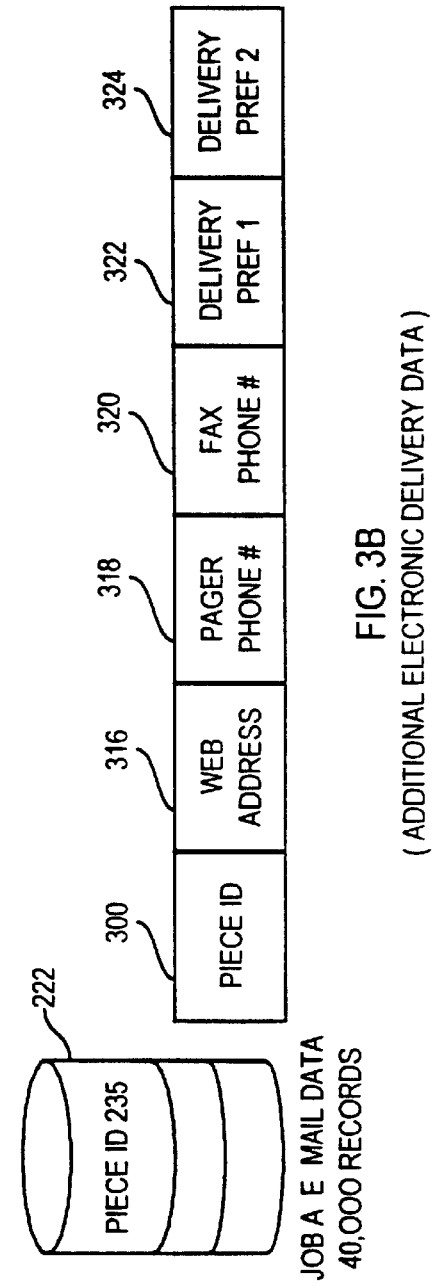
FIG. 3A (STANDARD MAIL DATA)
FIG. 3B (ADDITIONAL ELECTRONIC DELIVERY DATA)

SYSTEM AND METHOD FOR ELECTRONIC AND PHYSICAL MASS MAILING

TECHNICAL FIELD

The present invention relates to mass mail delivery mechanisms and, more particularly, to combined electronic and physical delivery mechanisms.

BACKGROUND ART

Many businesses currently send out mass mailings to their customers or prospective customers. For example, a utility, e.g. electric company, may send out hundreds of thousands of bills to its customers every month. As another example, a company may wish to send targeted marketing material, such as a sales letter, to prospective customers on a mailing list. In either example, a company may augment the bill or basic sales letter with additional material called "inserts," for example, a brochure or a glossy advertisement.

There currently exist computer systems, software, and specialized peripherals for producing mass mailings for physical delivery, e.g. through the U.S. Postal Service or by courier. With the advent of new forms of electronic mail delivery, however, it is becoming more desirable to augment existing mass mailing capability with electronic delivery mechanisms, such as by electronic mail (email), facsimile, pager, or publication to a page on the World Wide Web. However, there are many reasons why it is difficult to upgrade or replace these computers systems for electronic mail delivery.

Often these computer systems are called "legacy" computer systems because they are relatively old computer systems handed down from previous generations of company management. These legacy computer systems, however, are still effective and often control processing vital to the company's business, e.g. bill production. Such legacy systems for mass mailing document production typically run on a mainframe computer and are complex and expensive. Accordingly, companies are reluctant to modify, upgrade, or replace these critical document generation applications.

Another reason why upgrading a business application is difficult is that the business application is written by a third-party developer with exclusive access to the source code and unwilling or unable to upgrade the application. For example, the business application may have been written by a company that has gone out of business or discontinued support for that application.

Even if a company has access to the source code of its mass mailing application, the company may not have the resources in terms of time or programming staff to make the necessary modifications for electronic mail delivery.

As an additional complication, electronic mail delivery may take a variety of forms, e.g. email, facsimile, pager. Each electronic delivery mechanism imposes restrictions on the nature of inserts added to the mailing. For example, an alphanumeric pager can only receive a small number of characters.

DISCLOSURE OF THE INVENTION

There exists a need for adding capabilities of electronic mail delivery to existing mass mailing systems. There is also a need for handling inserts in a manner appropriate to the delivery mechanism.

These and other needs are met by an electronic delivery system and method in which a printstream processor separates documents into a physical delivery printstream and an electronic delivery printstream based on delivery preferences stored in a database. A printer prints the physical delivery printstream to create printed documents. A physical inserter generates physical mail pieces including one of the printed documents and, for at least some of the physical mail pieces, respective physical inserts. An electronic inserter splits the electronic delivery printstream into electronic documents and generates electronic mail pieces. Each of the electronic mail pieces includes one of the electronic documents and, for at least some of the electronic mail pieces, an electronic insert. The electronic insert may be a link to a World Wide Web site, a text attachment, a document, or an electronic copy of a physical insert.

A message router delivers the electronic mail pieces via an electronic delivery mechanism specified in the delivery preferences, e.g. to a web server, an electronic mail address, a pager, a facsimile machine, and a printer. Preferably, the message router is configured to deliver an electronic mail piece by one electronic delivery mechanism and a notification message by another electronic delivery mechanism. The system may include a regeneration processor for causing a physical mail piece to be generated, corresponding to an electronic mail piece that has not been delivered.

Another aspect of the invention is a method of mass mailing in which a first batch of print images is received. The method includes determining whether or not each print image is to be delivered physically, in which case the print image is stored in a second batch, or electronically, in which case the print image is stored in a third batch. Preferably, first records indicating a physical delivery address is stored for all the print images of the first batch, and second records indicating an electronic delivery address is stored for all the print images of the third batch.

The software aspects encompass media or carrier waves bearing sequences of computer executable instructions for performing the steps of the invention. A computer readable medium, as used herein, may be any medium that can bear instructions or code for performing a sequence of steps in a machine readable form, such as a floppy disk, flexible disk, hard disk, magnetic tape, any other magnetic medium, a CD-ROM, an other optical medium, a RAM, ROM, PROM, EPROM, FLASH-EPROM, and any other memory chip or cartridge. A carrier wave signal is any type of signal that may carry digital information representative of the instructions or code for performing a sequence of steps. Such a carrier wave may be received via a network, over a modem, or as a radio-frequency or infrared signal, or any other type of signal which a computer may receive and decode.

Additional objects, advantages, and novel features of the present invention will be set forth in part in the detailed description which follows, and in part will become apparent upon examination or may be learned by practice of the invention. The objects and advantages of the invention may be realized and obtained by means of the instrumentality's and combinations particularly pointed out in the appended claims.

BRIEF DESCRIPTION OF DRAWINGS

The present invention is illustrated by way of example and not by limitation, in the figures of the accompanying drawings, wherein elements having the same reference numeral designations represent like elements throughout and wherein:

FIGS. 3A and 3B are diagrams showing the format of records of the mail run datafile and of the electronic mail run datafile according to an embodiment.

BEST MODE FOR CARRYING OUT THE INVENTION

A system and method of physical and electronic printstream delivery are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Printstream Delivery Architecture Overview

Figure 1:
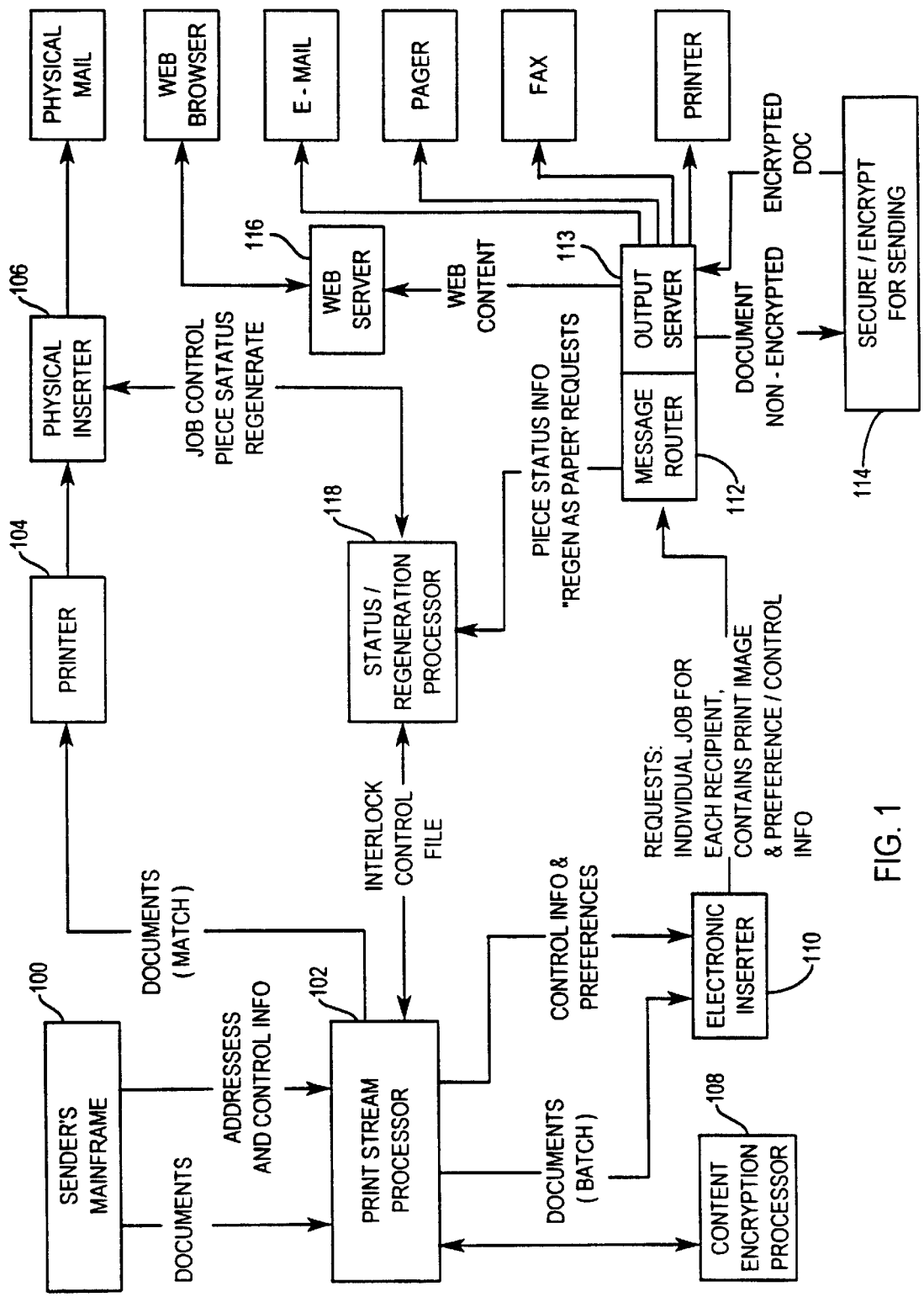
FIG. 1 is a diagram of the printstream delivery architecture according to an embodiment.

FIG. 1 depicts a printstream delivery architecture according to an embodiment of the present invention. A user at a sender's mainframe 100 submits to printstream processor 102 documents in a printstream, addressing information in the form of delivery preferences stored in a database, and control information specifying, e.g., what inserts are to be included with each document in the printstream.

A printstream may be a batch of documents or print images of documents produced by a third-party or legacy business application. For example, a billing system may produce a batch of bills that are to be printed and sent to each customer. By employing a printstream processor 102 as a post processor with supplemental addressing and control information outside of the business application that produced the printstream, the functionality of the business application can be extended without change to the business application.

Printstream processor 102 splits the submitted printstream into one of two printstreams based on the addressing information in the delivery preferences. One printstream is a physical delivery printstream, in which the documents are to be delivered, as specified in the addressing information, to a physical address via a physical delivery mechanism, for example, the U.S. Postal Service or a courier service. The other printstream is an electronic delivery printstream, in which the documents are to be delivered via an electronic delivery mechanism, e.g. the electronic mail or facsimile, as specified in the delivery preferences. Printstream processor 102 may encrypt the documents with a content encryption processor 108.

The physical delivery printstream is sent from the printstream processor 102 to a printer 104 where the documents in the physical delivery printstream are printed on a tangible medium such as paper. The printed documents are sent to a physical inserter 106 where they are processed into physical mail pieces. For example, a physical mail piece may contain a properly addressed envelope with the proper postage and stuffed with the printed document. In addition, the envelope may include additional printed matter, called physical inserts, selected according to criteria in the control information. The physical mail pieces are then ready for delivery by traditional means, e.g. through the U.S. Postal Service.

The electronic delivery printstream is sent to an electronic inserter 110, which separates out the individual documents in the electronic delivery printstream and combines the document with the appropriate electronic insert based on the control information to produce an electronic mail piece. Moreover, the nature of the electronic insert is tailored to the particular electronic delivery mechanism specified in the addressing information. For example, an insert for a facsimile delivery is another document faxed along with the individual document. As another example, delivery to a World Wide Web site involves an insert which is a link specifying the URL (Uniform Resource Location) of another page on the World Wide Web.

The separate electronic mail pieces are sent to message router 112 for delivery to the delivery mechanism specified in the addressing information, e.g. to a web server 116, electronic mail address, pager, facsimile machine, or a networked printer. The message router 112 is configured to send a separate notification via another delivery mechanism. For example, message router 112 may deliver an electronic mail piece to a web server 116 and send the recipient a generic fax that informs the recipient of the delivery to the web server 116. In addition, message router 112 may encrypt or otherwise provide for security of the outgoing electronic mail piece via security module 114.

If the electronic mail piece is not delivered after a certain length of time, the message router 112 generates and sends a "failed to process" or "failed to deliver" message to status/regeneration processor 118, which (depending on the users configured system, which system is configurable) may cause a physical version of the undelivered electronic mail piece to be produced by printer 104 and physical inserter 106 and delivery by physical means.

Printstream Processor

Figure 2:
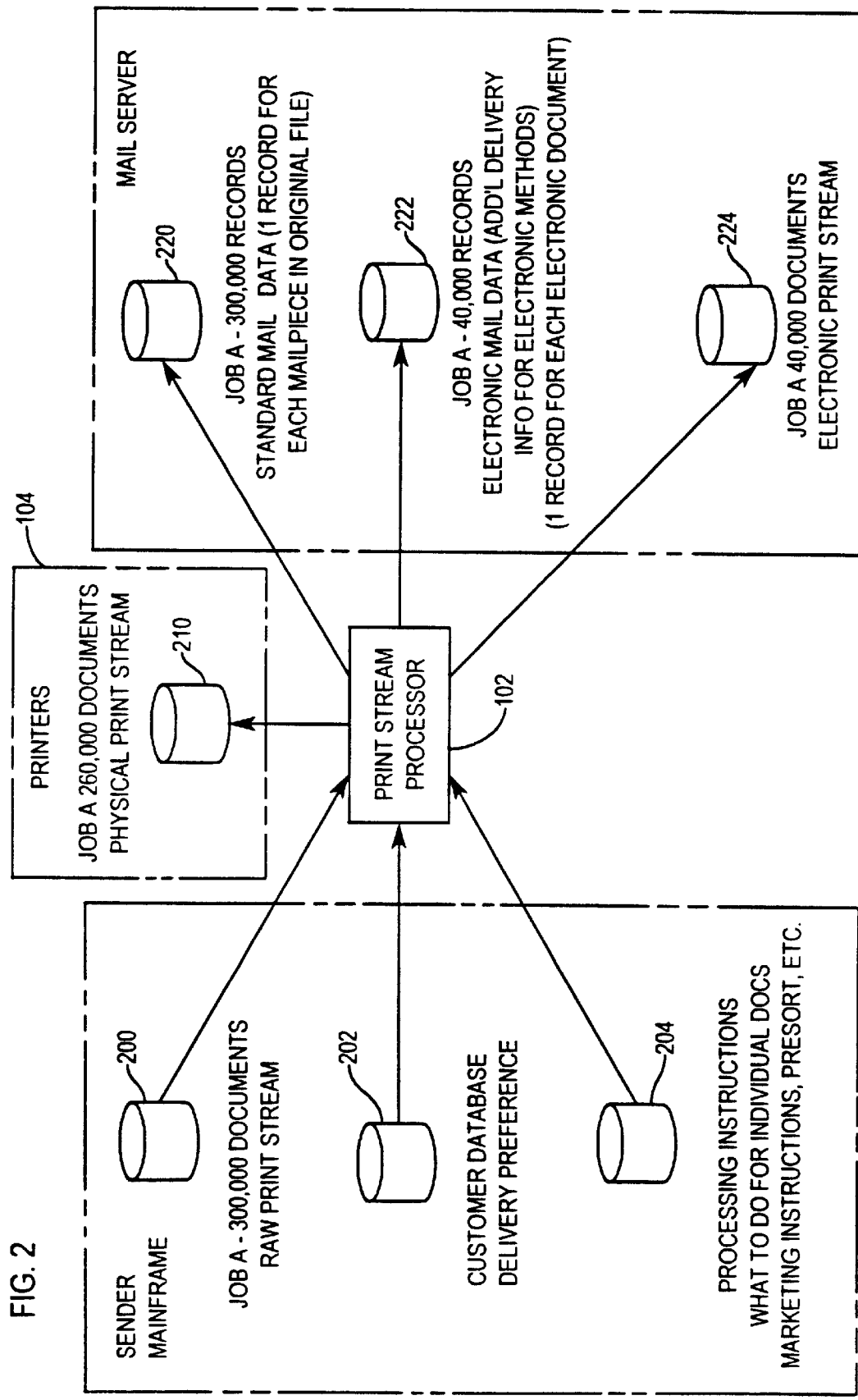
FIG. 2 is an input/output diagram of a printstream processor according to an embodiment.

Exemplary input and output of printstream processor 102 is illustrated in FIG. 2. A user at a mainframe may submit to the printstream processor 102 a job "A" comprising 300,000 documents in a raw printstream 200. This raw printstream 200 may be the output of a legacy application executing on the mainframe. The printstream processor 102 may be an application executing on the same mainframe or an application executing on another computer, e.g. a workstation or PC, networked to the mainframe.

The printstream processor 102 utilizes a customer database 202 of delivery preferences that indicate how each document for each recipient is to be delivered, e.g. physically, by fax, etc. Control information 204 is also input to printstream processor 102 to specify processing instructions, for example, which inserts are to be included and whether to presort the documents.

Printstream processor 102 separates the raw printstream into two printstreams, one for physical delivery and another for electronic delivery. In the example depicted in FIG. 2, printstream processor 102 separates raw printstream 200 into a physical delivery printstream 210 comprising 260,000 documents. Physical delivery printstream 210 is sent to printer 104 for the next step in the physical delivery process. The other printstream is electronic delivery printstream 224 comprising the remaining 40,000 documents of the raw printstream 200. Electronic delivery printstream 224 is sent to electronic inserter 110 for the next step in the electronic delivery process.

Printstream processor 102 also produces two datafiles, mail run datafile 220 and electronic mail run datafile 222. Mail run datafile 220 contains one record for every document in the original raw printstream 200. The contents of each record in mail run datafile 220 is illustrated in FIG. 3. Each mail run datafile 220 record includes a piece identifier 300, which may specify the sort order of the documents. In addition, each record may contain one or two insert selections 302 and 304, which specify the insert(s) that may be included with the respective document. For example, an insert selection 302 for a physical mail piece may be a brochure describing a ski resort in Vermont. The mail run datafile 220 record also includes such physical delivery information as a ZIP code 306, an account identifier 308, a name 310, an address 312, and a number of pages 314 for the document. The mail run datafile 220 is used by the printer 104 and physical inserter 106 for generating physical mail pieces with the selected inserts and the proper physical mail address.

If a mail piece is to be delivered by electronic means, as specified in the customer database 202 of delivery preferences, the printstream processor 200 creates a record in the electronic mail run datafile 222 in parallel to the mail run datafile 220. Thus, the tenth record in electronic mail run datafile 222 corresponds to the tenth electronic mail piece in electronic delivery printstream 224. Each of the electronic mail run datafile 222 records contain a piece identifier 300, in order to match up with the corresponding record in the mail run datafile 220. The records also contain electronic delivery information derived from the customer database 202 such as a Web address or URL 316, a pager telephone number 318, and a fax number 320. In addition, the records contain delivery and notification preferences 322 and 324, to specify which delivery option is to be given priority. As described in more detail hereinafter, the electronic delivery information in records of the electronic mail run datafile 222 is attached to the respective electronic mail piece by electronic inserter 110 for delivery by message router 112.

Although mail run datafile 220 contains information mainly for physical delivery, all documents to be delivered electronically have a corresponding entry in mail run datafile 220 in case the mail piece has to be delivered physically. Electronic mail pieces may require physical delivery, via regeneration processor 118 described in more detail hereinafter, if the electronic delivery mechanisms do not successfully deliver the electronic mail piece. For example, electronic mail piece 235 in FIG. 3 has a record in both mail run datafile 220 and electronic mail run datafile 222.

Electronic Inserter

Figure 4:
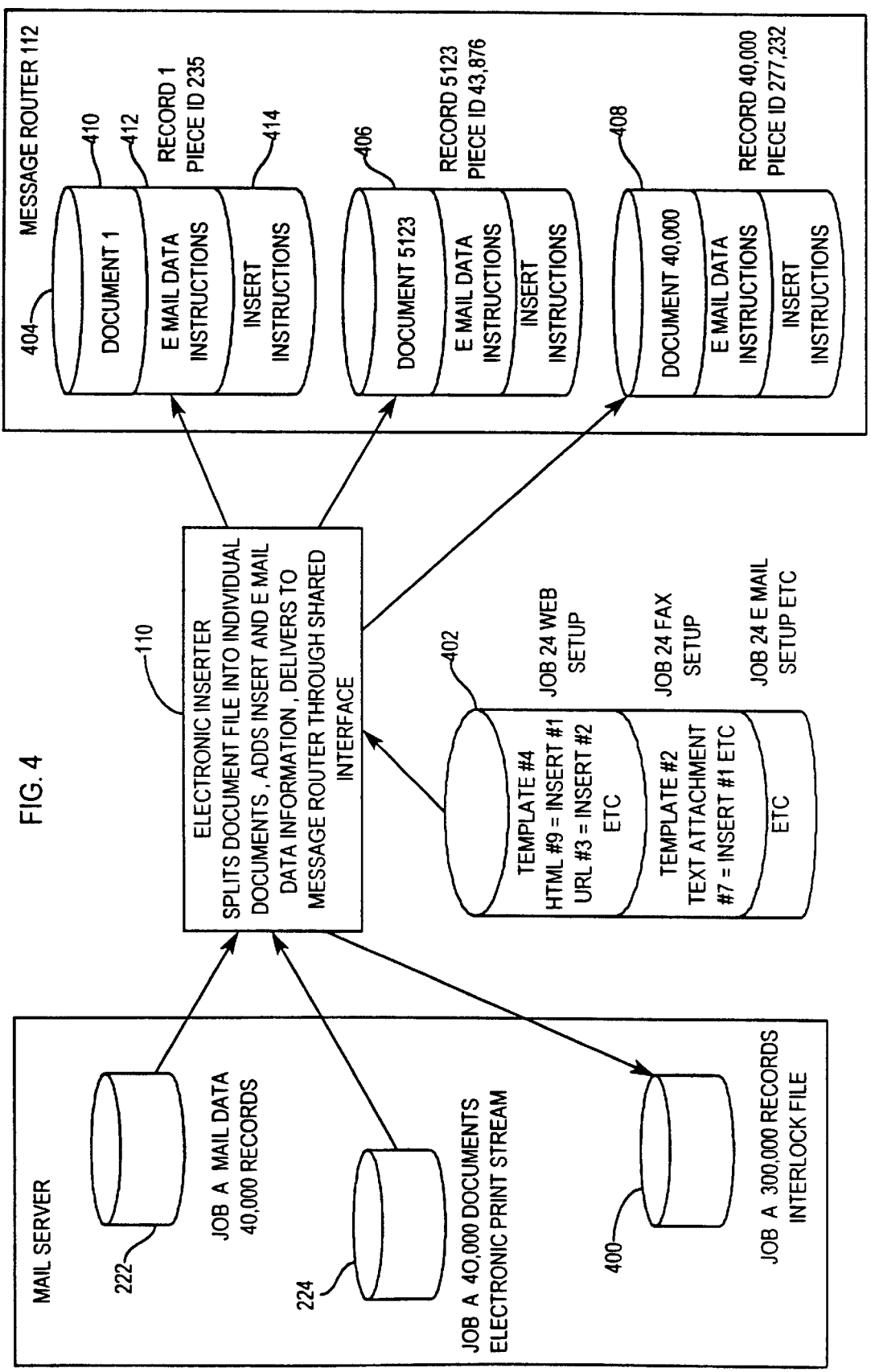
FIG. 4 is an input/output diagram of an electronic inserter according to an embodiment.

As depicted in FIG. 4, electronic inserter 110 splits the electronic delivery printstream 224 into individual electronic mail pieces and packages them with an insert appropriate for the electronic delivery mechanism specified for the electronic mail pieces. Electronic inserter 110 is preferably a computer software application, which may be executed on the same computer as the printstream processor 102 or another computer on the same network.

FIG. 4 depicts three electronic mail pieces 404, 406, 408, which may be produced by electronic inserter 110. Each electronic mail piece, e.g. piece 404, comprises a document 410 obtained from electronic delivery printstream 224, which was split from raw printstream 200 by printstream processor 102. The electronic mail piece also includes electronic mail data instructions 412 derived from the corresponding record in the electronic mail run datafile 222, and insert instructions 404 derived from job setup file 402.

Inserts for each batch of mail are defined by a job setup. For example, a record in the mail run datafile 220 may call for insert 1, which may be targeted marketing material for ski vacations in Vermont. In the physical inserter 106 a stack of brochures about ski resorts in Vermont may be loaded for insertion. In the case of the electronic inserter 110, for a particular batch of mail, the insert needs to be developed in a format appropriate for each delivery mechanism.

Accordingly, the job setup for this batch of mail, e.g. job setup file 402, contains a set of templates and inserts for each delivery mechanism. The job setup for the web server delivery mechanism may specify the URL of a home page for a Vermont ski resort. If the delivery mechanism is electronic mail, the corresponding insert may specify a text memo to be attached to an electronic mail message. It is possible for a job setup to specify no appropriate insert for a specific delivery mechanism, e.g. fax. It is noted that templates may specify logos and standard information to be included in each document. Job setups may also specify "hot-links," which are inserts with no corresponding physical counterparts, for example, a corporate logo on a corporate web page.

Job setups can also specify a generic notification message for each delivery mechanism available for notification. For example, a fax may be sent to a recipient, informing the recipient that a web page includes his latest statement, for example a monthly billing statement. Generic notification messages are not personalized, and so can be predefined for an entire job or batch of mail pieces.

Figure 5:
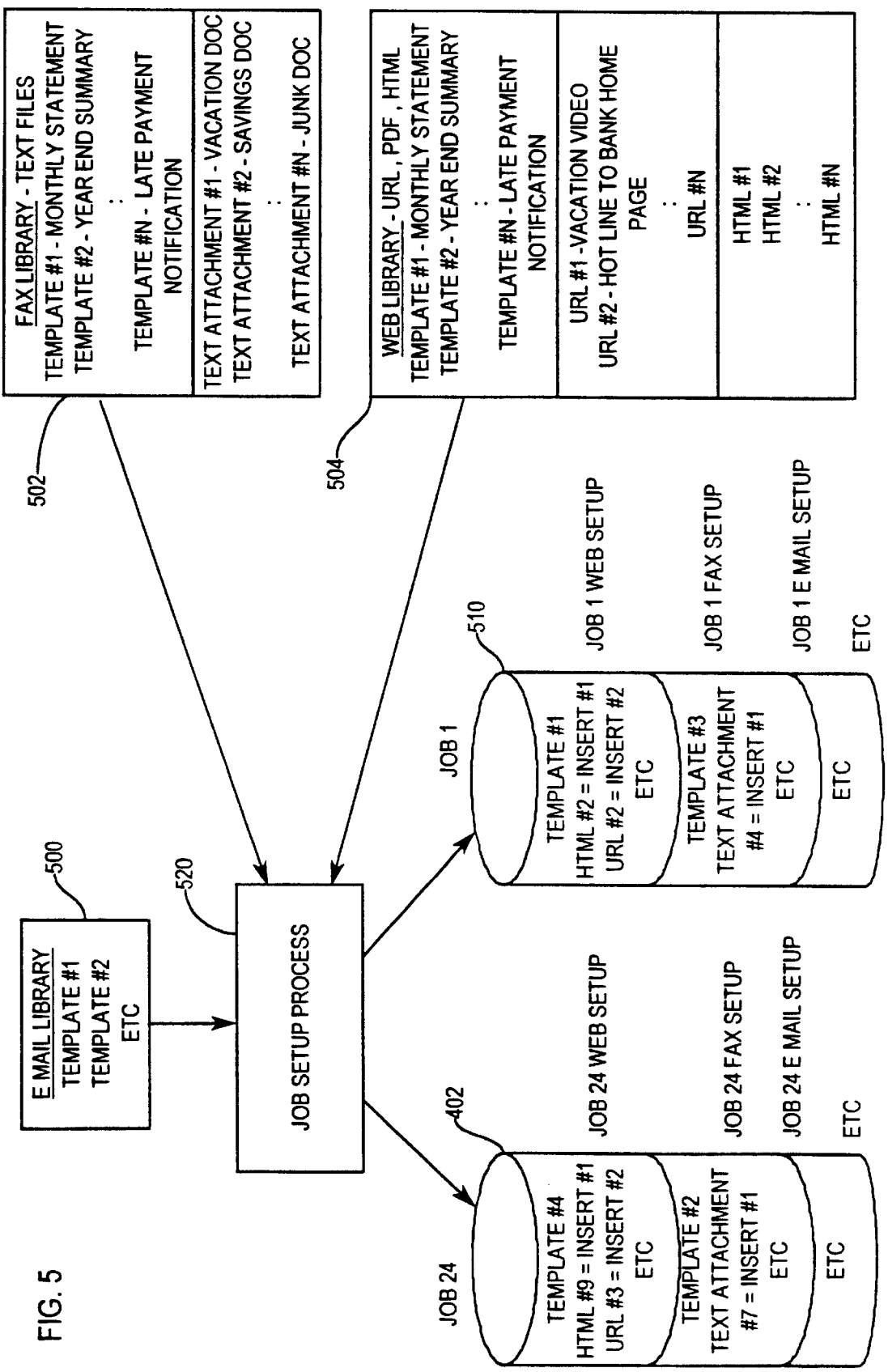
FIG. 5 is an input/output diagram of a job setup process according to an embodiment.

Referring to FIG. 5, job setups may be defined by a job setup process 520 (not shown in FIG. 1). The job setup process is an interactive application that allows a user to select templates and inserts for each delivery mechanism from a library. For example, electronic mail library 500 includes templates for formatting electronic mail messages. Fax library 502 may include templates and inserts as text files and text attachments to be sent along with a fax. Web library 504 includes the inserts in the form of URLs (web page addresses), PDF (Postscript Display Format, a portable display standard), or HTML (Hyper-Text Markup Language) files, which are common on the World Wide Web. Thus, the job setup process 520 prompts the user for templates, HTML files, text attachments, e.g. through a dialog box or a form for each electronic delivery mechanism. The job setup process 520 records and enables editing of the user's selections of templates and inserts for each electronic delivery mechanism. The output of the job setup process 520 is a job setup file, e.g. job setup file 402 and job setup file 518.

Referring back to FIG. 4, electronic inserter 110 applies job setup file 402 to a batch of mail pieces in the electronic delivery printstream 224 for producing electronic mail pieces 404, 406, and 408 with the appropriate insert instructions, e.g. insert instructions 414. The electronic inserter 110 also reads out corresponding records from electronic mail run datafile 222 for generating the application electronic delivery information 412 in each electronic mail piece. Furthermore, the electronic inserter 110 stores status information about each electronic mail piece in interlock file 400. Each electronic mail piece is placed on a server executing message router 112, which may be a separate server from the mail server upon which the electronic inserter 110 is executed.

Message Routing

The message router 112 detects that a new electronic mail piece has been received from the electronic inserter 110. The message router 112 decodes the delivery preference data 322 and 324, which was derived from the corresponding record in electronic mail run datafile 222 and appended to the electronic mail piece as electronic mail delivery instructions 412 by electronic inserter 110. Message router 112 sends the electronic mail piece to an output server subsystem 113 (shown in FIG. 1) for actual delivery. For example, if web server 116 is specified by the first delivery preference 322, the output server subsystem 113 sends the electronic mail piece to web server 116. The system may be configured to wait for a preset amount of time, e.g. four days, for the recipient to access the web page where the electronic mail piece was delivered. If the recipient has not accessed the web page in the preset amount of time, the electronic mail piece is considered not be delivered. For other delivery mechanisms, the delivery failure may be detected more directly, e.g., in the case of a busy signal for a fax number.

If the electronic mail piece is not delivered according to the delivery mechanism specified in the first delivery preference 322, the corresponding document is processed according to the second delivery preference 324 until all the delivery preferences have been exhausted. Status for each electronic mail piece is reported to status/regeneration processor 118 and stored in the interlock file 400. It is important for the message router 112 to be provided with a complete electronic delivery package, that is an electronic mail piece with insert instructions 414 for each electronic delivery mechanism, because the electronic mail piece may be in process for many days after the electronic inserter 110 has processed the entire batch. For example, the message router 112 may have to wait days for the Web server 116 to be accessed before utilizing the second delivery option.

The message router 112 communicates with the electronic inserter 110 through message files. For example, a separate downloaded configuration file (not shown) may specify whether to stop processing or ignore when an attachment file is missing. There is also communication for indicating that error conditions have been fixed and that the message router 112 should restart processing if stopped.

Status/Regeneration Processor

Figure 6:
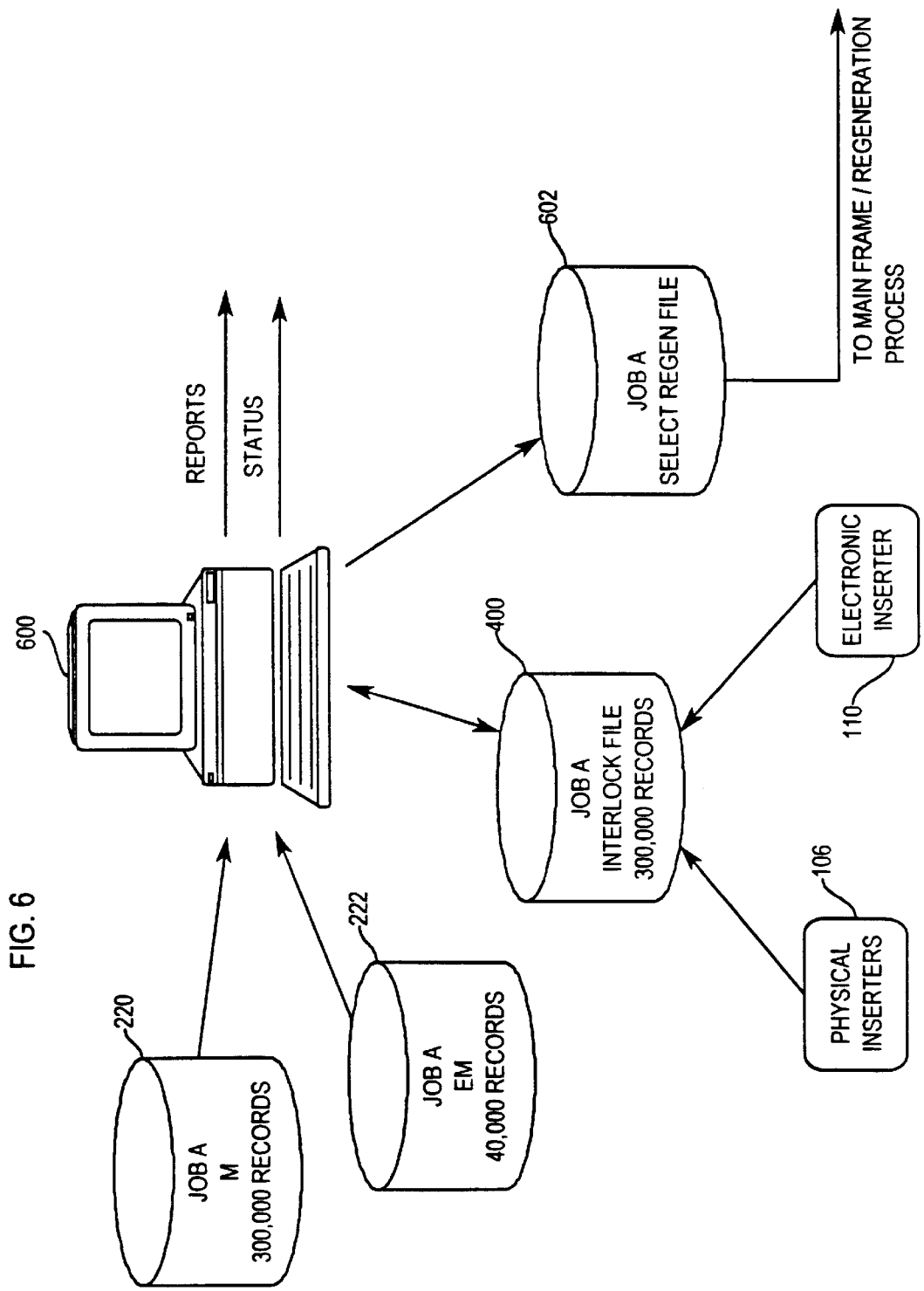
FIG. 6 is an input/output diagram of a regeneration processor according to an embodiment.

The interlock file 400 is used for checking document status and determining which electronic mail pieces need to be regenerated if all the electronic delivery mechanisms have proved unsuccessful. In particular, the status/regeneration processor 118, which may be a program executing on mail server 600 in FIG. 6, scans the interlock file 400 for documents whose status indicates that regeneration is necessary. For physical mail pieces this may occur because the physical inserter 106 generated a bad insert, e.g. an insert jammed. For electronic mail pieces, regeneration maybe necessary for those electronic mail pieces that have not been successfully delivered.

Accordingly, the regeneration processor 118 outputs a "regen" file 602 containing the piece identifiers 300 of the documents that need to be regenerated, printed by printer 104, and processed by physical inserter 106.

While the present invention has been described in connection with what is presently considered to be the most practical and preferred embodiments, it is to be understood that the invention is not limited to the disclosed embodiment, but, on the contrary, is intended to cover various modifications and equivalent arrangements included within the spirit and scope of the appended claims.

What is claimed is:

1. A system for generating mail pieces for delivery to recipients in one of printed or electronic form comprising:

a printstream processor to receive a printstream, said printstream including mail piece data corresponding to a plurality of mail pieces, each one of said plurality of mail pieces intended for a respective recipient, said printstream processor separating said printstream into at least one of a physical delivery printstream and an electronic delivery printstream based on a respective preference prescribed by each respective recipient;

a printer coupled to the printstream processor for printing the physical delivery printstream to create a plurality of printed documents, each of said printed documents corresponding to a respective one of said plurality of mail pieces that is to be delivered in a printed form;

an inserter system coupled to the printer for generating mail pieces in printed form, wherein each mail piece in printed form includes one of the plurality of printed documents and wherein at least one of the mail pieces in printed form include respective printed inserts;

an electronic inserter coupled to the printstream processor for separating the electronic delivery printstream into a plurality of electronic documents, each of said electronic documents corresponding to a respective one of said plurality of mail pieces that is to be delivered in electronic form, and for generating mail pieces in electronic form, wherein each mail piece in electronic form includes one of the plurality of electronic documents and wherein at least one of the mail pieces in electronic form includes respective electronic inserts; and a message router coupled to the electronic inserter for delivering the mail pieces in electronic form.

2. The system of claim 1, further comprising a regeneration processor for receiving piece status information, said regeneration processor causing a mail piece corresponding to a mail piece in electronic form to be generated in printed form if the piece status information of the mail piece in electronic form indicates that the electronic mail piece has not been received by an intended recipient within a predetermined period of time.

3. The system of claim 1, wherein the message router is configured to deliver at least one of the mail pieces in electronic form to a World Wide Web server and wherein the electronic insert corresponding to the at least one of the mail pieces in electronic form is a link to a page on the World Wide Web.

4. The system of claim 1, wherein the message router is configured to deliver at least one of the mail pieces in electronic form via electronic mail.

5. The system of claim 1, wherein the message router is configured to deliver at least one of the mail pieces in electronic form to a facsimile machine.

6. The system of claim 1, wherein the message router is configured to selectively deliver the mail pieces in electronic form by one of a plurality of delivery mechanisms based on recipient preference.

7. The system of claim 6, wherein the message router is configured to send a notification message by another of the plurality of delivery mechanisms confirming delivery of the mail pieces in electronic form.

8. A method for generating mail pieces for delivery to recipients in one of printed or electronic form comprising:

receiving a printstream, said printstream including mail piece data corresponding to a plurality of mail pieces, each one of said plurality of mail pieces intended for a respective recipient;

separating said printstream into at least one of a physical delivery printstream and an electronic delivery printstream based on a respective preference prescribed by each respective recipient;

printing the physical delivery printstream to create a plurality of printed documents, each of said printed documents corresponding to a respective one of said plurality of mail pieces that is to be delivered in a printed form;

generating mail pieces in printed form, wherein each mail piece in printed form includes one of the plurality of printed documents and wherein at least one of the mail pieces in printed form include respective printed inserts;

separating the electronic delivery printstream into a plurality of electronic documents, each of said electronic documents corresponding to a respective one of said plurality of mail pieces that is to be delivered in electronic form;

generating mail pieces in electronic form, wherein each mail piece in electronic form includes one of the plurality of electronic documents and wherein at least one of the mail pieces in electronic form includes respective electronic inserts; and delivering the mail pieces in electronic form.

9. The method of claim 6, further comprising:

receiving piece status information about one of said mail pieces in electronic form; and generating in printed form a mail piece corresponding to a mail piece in electronic if the piece status information of the mail piece in electronic form indicates that the electronic mail piece has not been received by an intended recipient within a predetermined period of time.

10. The method of claim 8, wherein:

the step of delivering the mail pieces in electronic form includes delivering at least one of the mail pieces in electronic form to a World Wide Web server, and the step of generating the mail pieces in electronic form includes inserting a link to a page on the World Wide Web.

11. The method of claim 8, wherein the step of delivering includes delivering at least one of the mail pieces in electronic form via electronic mail.

12. The method of claim 8, wherein the step of delivering includes delivering at least one of the mail pieces in electronic form to a facsimile machine.

13. The method of claim 8, wherein the step of delivering includes selectively delivering the mail pieces in electronic form by one of a plurality of delivery mechanisms based on recipient preference.

14. The method of claim 13, further comprising:

sending a notification message by another of the plurality of delivery mechanisms confirming delivery of the mail pieces in electronic form.

15. A method for generating mail pieces as recited in claim 8, further comprising the steps of:

providing a plurality of instruction templates, wherein each template identifies a format corresponding to one of a plurality of electronic delivery mechanisms;

associating each mail piece in electronic form with at least one of the plurality of instruction templates; and wherein the step of delivering the mail pieces in electronic form further comprises delivering the mail pieces in electronic form by one of the plurality of electronic delivery mechanisms associated with the at least one of the plurality of instruction templates.

16. A method for generating mail pieces as recited in claim 15 further including the steps of:

associating at least one mail piece in electronic form with at least first and second templates, wherein the first template provides a first choice electronic delivery mechanism and the second template provides a second choice delivery mechanism.

17. A method for generating mail pieces as recited in claim 16 further including the steps of:

determining if the at least one mail piece in electronic form was delivered by the first choice electronic delivery mechanism; and delivering the at least one mail piece in electronic form by the second choice delivery mechanism if the at least one mail piece in electronic form was determined not to be delivered by the first choice delivery mechanism.

18. A method for generating mail pieces as recited in claim 17, further including the step of:

waiting a predefined amount of time before performing the determining step.

19. A method for generating mail pieces as recited in claim 15 further including the step of:

notifying a recipient, by a method other than the electronic mechanism used to deliver the mail piece, that a mail piece in electronic form has been delivered by an electronic delivery mechanism.

20. A method for generating mail pieces as recited in claim 19 wherein the step of notifying a recipient includes the step of notifying a recipient with a facsimile message indicating that the mail piece in electronic form has been delivered.

21. A method for generating mail pieces as recited in claim 16 wherein the delivery mechanism is selected to deliver the mail piece in electronic form in accordance with one of the following delivery methods: an e-mail message; a pager message; a facsimile message or a site on the world wide web.

22. A method for generating mail pieces as recited in claim 15 further including the steps of:

providing insert instructions with each electronic mail piece indicating what electronic inserts are to be associated with the electronic mail piece; and wherein the step of delivering mail pieces in electronic form further includes delivering electronic inserts in accordance with the insert instructions.

23. A method for generating mail pieces as recited in claim 15 further including the step of:

encrypting the mail piece in electronic form before delivering it to a recipient.

24. A system for generating mail pieces as recited in claim 1 further comprising:

a database having a plurality of instruction templates, wherein each template corresponds to one of a plurality of electronic delivery mechanisms;

a computer processor for associating each electronic mail piece with at least one instruction template; and wherein the message router delivers the electronic mail pieces and respective electronic insert mail pieces by one of the plurality of electronic delivery mechanisms in accordance with the at least one instruction template.

25. A system for generating mail pieces as recited in claim 24, wherein the message router is configured to deliver at least one of the electronic mail pieces to a World Wide Web server and the electronic insert is a link to a page on the World Wide Web.

26. A system for generating mail pieces as recited in claim 24, wherein the message router is configured to deliver at least one of the electronic mail pieces via electronic mail.

27. A system for generating mail pieces as recited in claim 24, wherein the message router is configured to deliver at least one of the electronic mail pieces to a pager.

28. A system for generating mail pieces as recited in claim 24, wherein the message router is configured to deliver at least one of the electronic mail pieces to a facsimile machine and the electronic insert is a document.

29. A system for generating mail pieces as recited in claim 24, wherein the message router is configured to selectively deliver the electronic mailpieces to a web server, an electronic mail address, a facsimile machine, and a printer.

30. A system for generating mail pieces as recited in claim 24, wherein the message router is configured to send a notification message by one of the plurality of delivery mechanisms.

* * * * *